(12) United States Patent
Randhawa et al.

(10) Patent No.: US 10,876,919 B2
(45) Date of Patent: Dec. 29, 2020

(54) IN-PIPELINE OPTICAL INTERFERENCE-BASED COGNITIVE SYSTEM FOR LEAK AND DEFECT DETECTION

(71) Applicant: International Business Machines Corporation, Armonk, NY (US)

(72) Inventors: Sukanya Randhawa, Bangalore (IN); Ninad Sathaye, Bangalore (IN); Ashwin Srinivas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 15/966,685

(22) Filed: Apr. 30, 2018

(65) Prior Publication Data
US 2019/0331549 A1 Oct. 31, 2019

(51) Int. Cl.
G01M 3/38 (2006.01)
G01M 3/04 (2006.01)
G01M 3/08 (2006.01)

(52) U.S. Cl.
CPC .............. *G01M 3/38* (2013.01); *G01M 3/047* (2013.01); *G01M 3/08* (2013.01)

(58) Field of Classification Search
CPC ...... G01M 3/047; G01M 3/08; G01M 3/2807; G01M 3/2815; G01M 3/38
See application file for complete search history.

(56) References Cited

U.S. PATENT DOCUMENTS

| 7,418,354 B1 * | 8/2008 | Greenlee | G01M 3/2807 |
| | | | 702/51 |
| 7,920,983 B1 * | 4/2011 | Peleg | G01M 3/2807 |
| | | | 702/100 |

(Continued)

FOREIGN PATENT DOCUMENTS

| CN | 102537667 B | 7/2012 |
| EP | 3130900 A1 | 2/2017 |
| WO | 2016146500 A1 | 9/2016 |

OTHER PUBLICATIONS

Lun, Shuxian et al. "Multi-Sensor Adaptive Filtering Based on Neural Network for Leak Detection of Pipeline". Journal of Northeastern University (Natural Science), vol. 24, No. 8, Aug. 1, 2003, pp. 727-730. (Year: 2003).*

(Continued)

*Primary Examiner* — Michael A Lyons
(74) *Attorney, Agent, or Firm* — Ryan, Mason & Lewis, LLP

(57) ABSTRACT

Methods, systems, computer program products, and devices for in-pipeline optical interference-based cognitive systems for leak and defect detection are provided herein. A computer-implemented method includes obtaining optical interference-related data pertaining to at least one interior portion of a pipeline; obtaining multiple items of sensor data pertaining to the at least one interior portion of the pipeline; generating one or more pipeline-irregularity predictions by applying an inference-based algorithm to the optical interference-related data, the multiple items of sensor data, and one or more additional items of data, wherein each of the one or more pipeline-irregularity predictions comprises an identified location within the interior surface of the pipeline of a predicted irregularity and an estimated size of the predicted irregularity; and outputting the one or more pipeline-irregularity predictions to one or more users.

12 Claims, 9 Drawing Sheets

(56) References Cited

U.S. PATENT DOCUMENTS

| | | | |
|---|---|---|---|
| 9,841,134 B2 | 12/2017 | Ethirajan et al. | |
| 2002/0041379 A1* | 4/2002 | Lin | G01M 3/047 356/483 |
| 2014/0080224 A1* | 3/2014 | Tunheim | G01N 21/17 436/164 |
| 2016/0223120 A1 | 8/2016 | Gagliardo | |
| 2016/0356666 A1* | 12/2016 | Bilal | G01M 3/2807 |
| 2017/0076563 A1* | 3/2017 | Guerriero | G06F 16/245 |
| 2017/0097272 A1* | 4/2017 | Zulfiquar | G01M 3/02 |
| 2017/0219157 A1* | 8/2017 | Ethirajan | H04W 4/70 |
| 2018/0120811 A1* | 5/2018 | Randhawa | F16L 55/48 |
| 2018/0300639 A1* | 10/2018 | Abbas | G06N 7/005 |
| 2019/0331513 A1* | 10/2019 | Jalilian | G01M 3/2807 |

OTHER PUBLICATIONS

Bin Hussen, M.P. et al. "Sewer Defect Detection and Classification Using a Neural Network". Neural Network World, vol. 10, Part 4, 2000, pp. 597-606. (Year: 2000).*

Yang, Rong et al. "Improved Algorithm on Rule-Based Reasoning Systems Modeled by Fuzzy Petri Nets". IEEE International Conference on Fuzzy Systems 2, Feb. 2002, pp. 1204-1209. (Year: 2002).*

Wilk-Kolodziejczyk, Dorota. "Reasoning Algorithm for Creative Decision Support System Integrating Inference and Machine Learning". Computer Science, vol. 18, No. 3, 2017, pp. 317-338. (Year: 2017).*

Duran, Olga et al. "Pipe Inspection Using a Laser-Based Transducer and Automated Analysis Techniques". IEEE/ASME Transactions on Mechatronics, vol. 8, No. 3, Sep. 2003, pp. 401-409. (Year: 2003).*

Sinha, Sunil K. et al. "Classification of Underground Pipe Scanned Images Using Feature Extraction and Neuro-Fuzzy Algorithm". IEEE Transactions on Neural Networks, vol. 13, No. 2, Mar. 2002, pp. 393-401. (Year: 2002).*

Moselhi, Osama et al. "Classification of Defects in Sewer Pipes Using Neural Networks". Journal of Infrastructure Systems, vol. 6, No. 3, Sep. 2000, pp. 97-104. (Year: 2000).*

Guo et al., "Imagery Enhancement and Interpretation for Remote Visual Inspection of Aging Civil Infrastructure"—Tsinghua Science and Technology, pp. 375-380, vol. 13, No. S1, Oct. 2008.

Duran et al., "Automated Pipe Defect Detection and Categorization Using Camera/Laser-Based Profiler and Artificial Neural Network"—IEEE Transactions on Automation Science and Engineering, vol. 4, No. 1, Jan. 2007.

Salik et al., "Pipe Inspections: Robotic Laser Profiling Demystified"—http://precast.org/2013/04/pipe-inspections-robotic-laser-profiling-demystified/.

Wikipedia, Leak Detection, https://en.wikipedia.org/w/index.php?title=Leak_detection&oldid=836352863, Apr. 14, 2018.

* cited by examiner

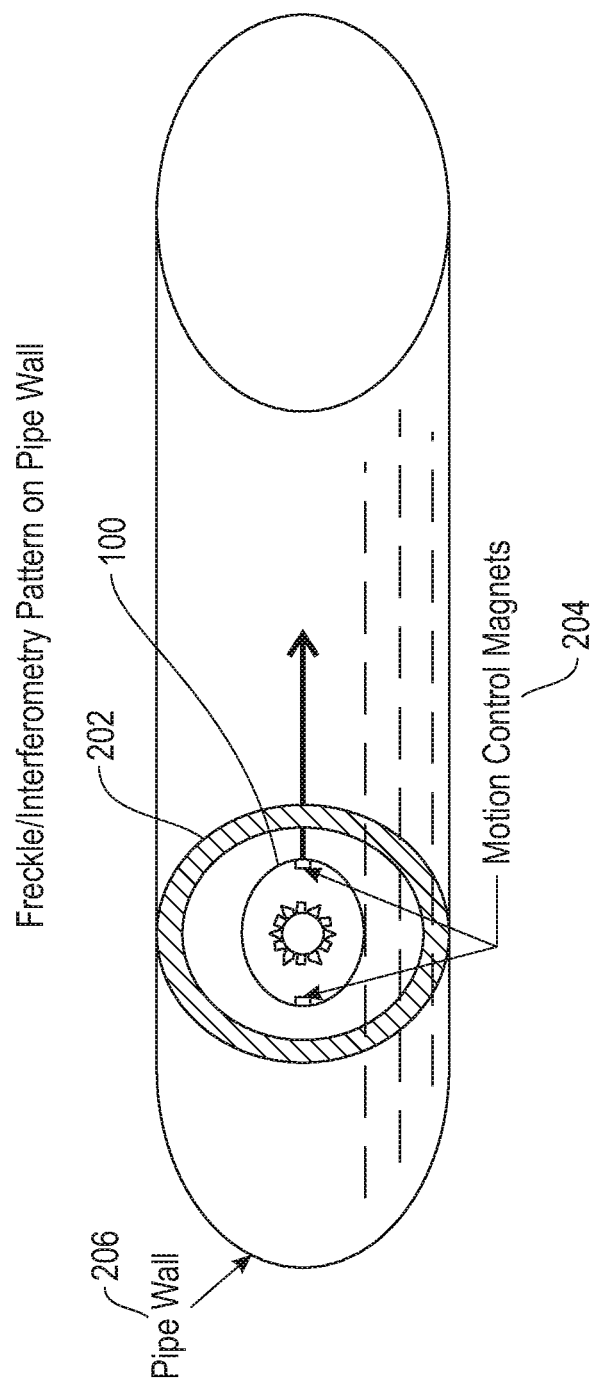

IN-PIPELINE OPTICAL INTERFERENCE-BASED COGNITIVE SYSTEM FOR LEAK AND DEFECT DETECTION

FIELD

The present application generally relates to information technology, and, more particularly, to pipeline management technology.

BACKGROUND

Pipelines such as sewer pipelines, gas pipelines, water pipelines, etc. can serve numerous functions and provide numerous benefits and conveniences. However, defects (such as cracks, for example) in such pipelines can cause significant losses in terms of operational and capital expenses, contamination and cleanup, etc. Further, physical challenges related to working with pipelines and high costs related thereto limit the ability of conventional approaches for early detection of defects and leaks.

SUMMARY

In one embodiment of the present invention, an in-pipeline optical interference-based cognitive system for leak and defect detection is provided. An exemplary computer-implemented method can include obtaining optical interference-related data pertaining to at least one interior portion of a pipeline; obtaining multiple items of sensor data pertaining to the at least one interior portion of the pipeline; generating one or more pipeline-irregularity predictions by applying an inference-based algorithm to the optical interference-related data, the multiple items of sensor data, and one or more additional items of data, wherein each of the one or more pipeline-irregularity predictions comprises an identified location within the interior surface of the pipeline of a predicted irregularity and an estimated size of the predicted irregularity; and outputting the one or more pipeline-irregularity predictions to one or more users.

In another embodiment of the invention, an in-pipeline defect detection device can include multiple light-emitting sources, one or more detection sources, and at least one processor coupled to at least one memory, wherein the at least one processor generates one or more pipeline-irregularity predictions by applying an inference-based algorithm to data obtained via (i) the multiple light-emitting sources and (ii) the one or more detection sources, wherein each of the one or more pipeline-irregularity predictions comprises (a) an identified location within the interior surface of the pipeline of a predicted irregularity and (b) an estimated size of the predicted irregularity. Such a device also includes a housing component encasing (i) the multiple light-emitting sources, (ii) the one or more detection sources, and (iii) the at least one processor coupled to at least one memory, wherein the housing component comprises one or more motion control components that facilitates controlling motion of the in-pipeline defect detection device within a pipeline.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a diagram illustrating an in-pipeline defect detection device within a pipeline, according to an exemplary embodiment of the invention;

DETAILED DESCRIPTION

Figures 1A, 1B:
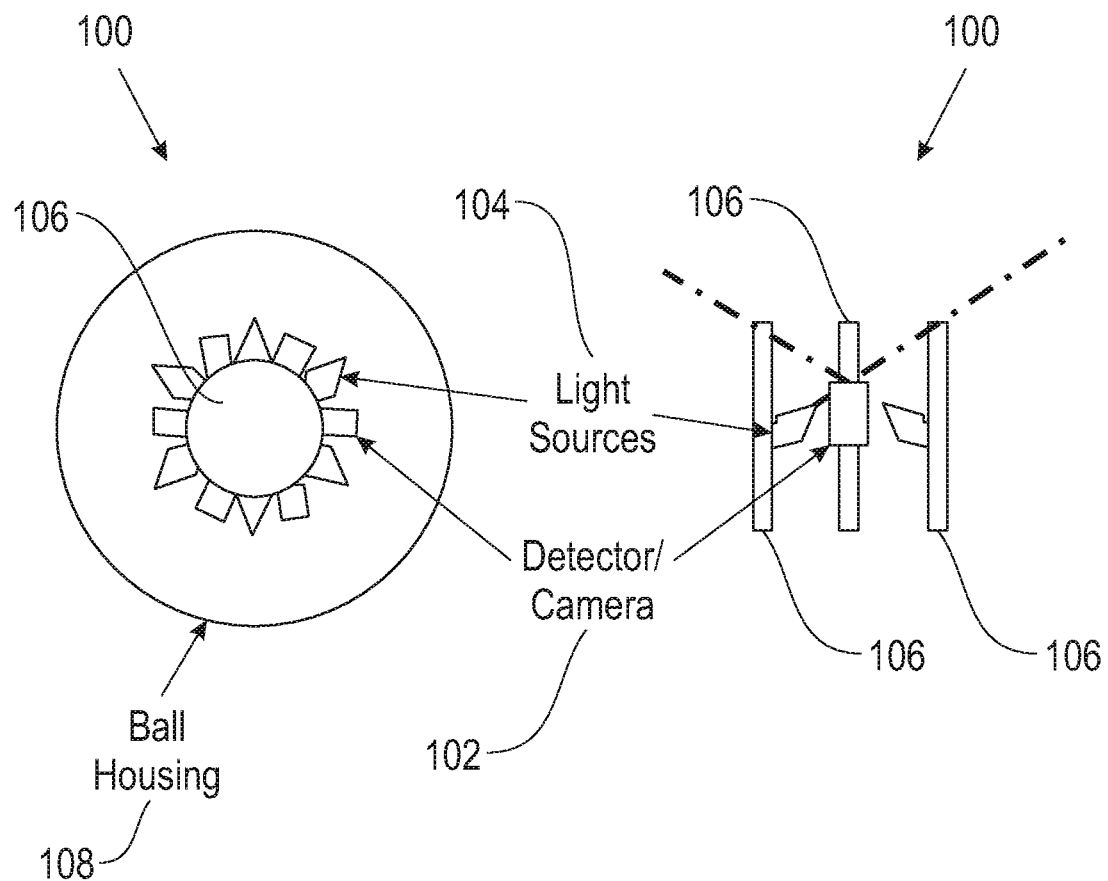
FIG. 1A is a diagram illustrating a side view of an in-pipeline defect detection device, according to an exemplary embodiment of the invention.
FIG. 1B is a diagram illustrating a top view of an in-pipeline defect detection device, according to an exemplary embodiment of the invention.

As described herein, an embodiment of the present invention includes implementing an optical interference-based in-pipe detector device for continuously monitoring and detecting leaks in a pipeline (or "pipe," as also used herein). In one or more such embodiments, the optical interference-based in-pipe detector device can include an array of one or more light-emitting diodes (LEDs), one or more sensors (such as, flow sensors, pressure sensors, accelerometers, global positioning system (GPS) sensors, etc.) and one or more cameras.

At least one embodiment of the invention includes using such a device to gather information such as one or more fringe patterns generated by the LEDs (of the device), wherein fringe patterns are sensitive to surface defects of a pipe. Additionally, such an embodiment can also include collecting various parameters at a given location of the pipeline obtained via sensors (such as, flow sensors, pressure sensors, accelerometers, global positioning system (GPS) sensors, a flow perturbation indicator etc.), wherein such measured and/or sensed parameters can be used for predicting surface irregularities of the pipe. Such measurements can facilitate accurate determination of the position, size, likelihood and/or severity of a leak or surface defect.

Further, one or more embodiments of the invention can include incorporating and/or utilizing crowd-sourced information (such as, for example, social media commentary, public complaints, etc.) that can provide insights on leaks or defects in a specific region of the pipeline. Also, at least one embodiment of the invention can include incorporating and/or utilizing maintenance history of the pipeline to further facilitate determining the position, size, likelihood and/or severity of a leak or surface defect.

As also detailed herein, one or more embodiments of the invention include analyzing, via an inference-based reasoning algorithm, the gathered information to determine and/or identify a leak and/or surface defect in a pipeline. Such an inference-based reasoning algorithm can analyze changes in fringing patterns using a trained neural network to determine the presence of surface discontinuity with a certain probability. The additional measurements obtained via the device sensors can assist in such determinations, providing increased accuracy and/or increased certainty. At least one embodiment of the invention can include implementing the device and inference-based reasoning algorithm in conjunction with a continuous feedback mechanism to a training model for improved leak detection over time.

Accordingly, one or more embodiments of the invention include implementing an optical interference-based in-pipe detector device to continuously monitor for surface defects within a pipe. Such an embodiment can include computing a flow perturbation indicator that helps in predicting pipe surface irregularities. The number of surface irregularities in a pipeline, as well as the severity of such surface irregularities, contribute to the flow perturbation associated with that pipeline. Accordingly, as used herein, a flow perturbation indicator can refer to a means for obtaining an estimate (qualitative and/or quantitative) of the surface irregularities within a given pipeline.

Additionally, as detailed above and herein, at least one embodiment of the invention includes implementing an inference-based reasoning algorithm that analyzes changes in fringe-patterns, axis orientation, one or more flow characteristics, crowd-sourced information, and/or maintenance records to predict the location and size of surface irregularities (cracks, etc.) with a certain confidence level. In connection with the inference based reasoning algorithm, at least one embodiment of the invention can include computing two probabilities: a first probability (P1) is computed by analyzing changes in a fringing pattern using a trained NN to surmise the presence of one or more surface discontinuities. Also, using additional data, such an embodiment can include computing a second probability (P2) to predict the location and the size of surface irregularities. Further, one or more embodiments of the invention can include rating the surface discontinuity (or leak) as potentially hazardous and/or dangerous. Such an embodiment can also include estimating a timeline for a leak to develop into a burst, thereby creating a forewarning.

Utilizing the optical sensing capabilities of the detector device detailed herein enables one or more embodiments of the invention to carry out robust and efficient detection of in-pipe leaks by improving the inference process which would otherwise be susceptible to changes in operating conditions (such as valve open/close, pump on/off or aging of pump and/or valves). Such an embodiment can include generating predictions and/or recommendations based on measured and/or sensed inputs, historic records, system feedback from previous repair cycles, running extended period of time simulations on crack/defect propagation and other dynamic factors.

FIG. 1A is a diagram illustrating a side view of an in-pipeline defect detection device 100, according to an exemplary embodiment of the invention, and FIG. 1B is a diagram illustrating a top view of an in-pipeline defect detection device 100, according to an exemplary embodiment of the invention. By way of illustration, FIG. 1A and FIG. 1B depict detectors and/or cameras 102, light sources 104 (such as optical laser diodes), a housing case 106 (on which the light sources 104 and detectors/cameras 102 are attached), and a ball housing 108 (which can be glass, plastic, etc.). The housing case 106 can include, for example, electronics, wiring, batteries, etc. As noted above, light sources 104 at different angles, as well as detectors/cameras 102 that are in-between angled light-source pairs (that can be slightly pointed towards each other, as illustrated in FIG. 1B), are all mounted on housing case 106. Additionally, as further detailed herein, an in-pipeline defect detection device 100 such as depicted in FIG. 1A and FIG. 1B can also include a microprocessor and a communication component, as well as one or more other computing device-related capabilities.

Figure 2B:
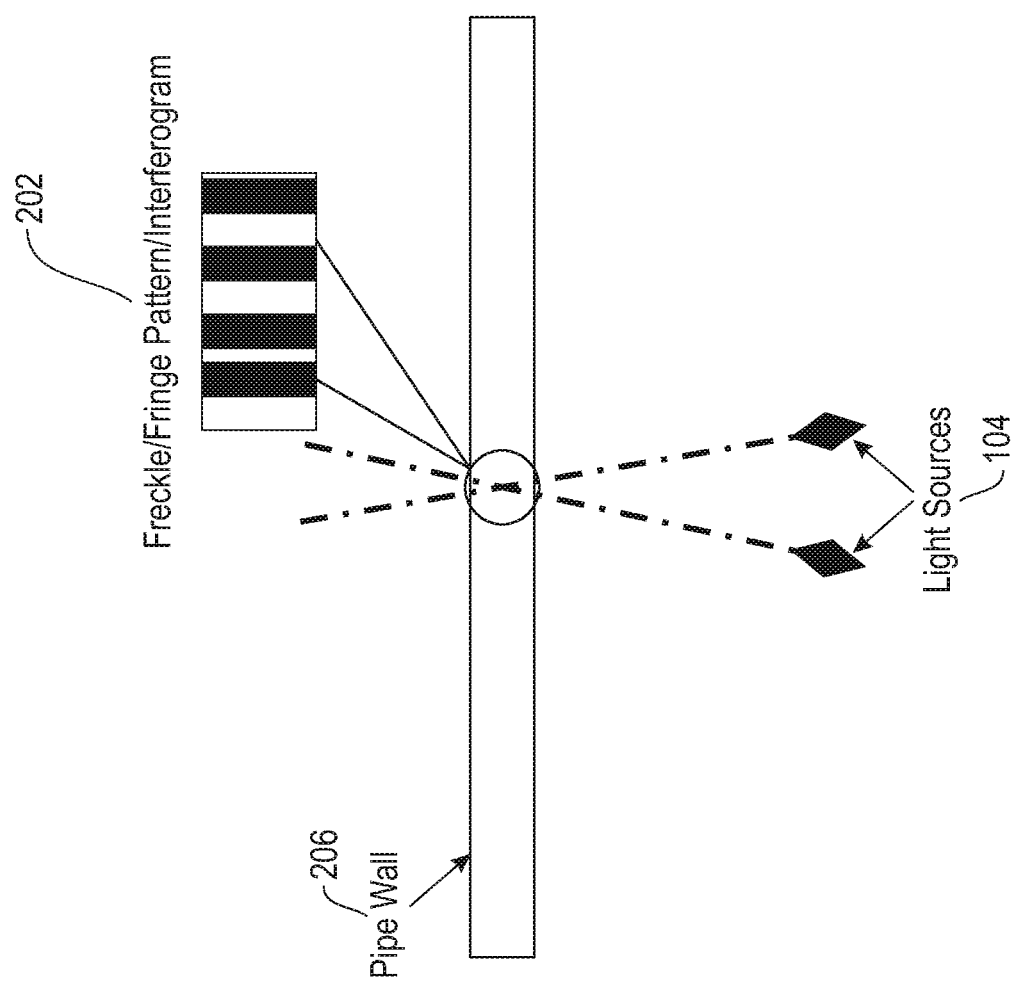
FIG. 2B is a diagram illustrating a freckle/fringe pattern and/or interferogram within a pipeline wall, according to an exemplary embodiment of the invention.

FIG. 2A is a diagram illustrating an in-pipeline defect detection device 100 within a pipeline 206, according to an exemplary embodiment of the invention. By way of illustration, FIG. 2A depicts a (360°) freckle/fringe and/or interferometry pattern 202 on the interior wall of the pipe 206. As used herein, freckle patterns refer to an interference pattern that is produced when two light beams (that are of similar wavelength, coherent or correlated to each other) meet each other or are superimposed in connection with each other. Also referred to herein as fringe patterns, such patterns are sensitive to the path traveled by a wave, which is also a function of any physical deformities that could lead to such path delays. The change in interference pattern therefore can serve as an indication of a surface defect or crack in a pipeline. Additionally, FIG. 2B is a diagram illustrating a freckle/fringe pattern and/or interferogram 202 within a pipeline wall 206, according to an exemplary embodiment of the invention. The freckle/fringe pattern and/or interferogram 202 can be generated by light sources 104 of the in-pipeline defect detection device 100.

Referring again to FIG. 2A, the in-pipeline defect detection device 100 includes motion control magnets 204, which can facilitate control of forward and/or backward rolling of the device 100. Further, in at least one embodiment of the invention, movement of the detection device 100 from location to location within a pipeline can be accomplished by various means, such as, for example, via a mote carrying the detection device 100.

Figure 3:
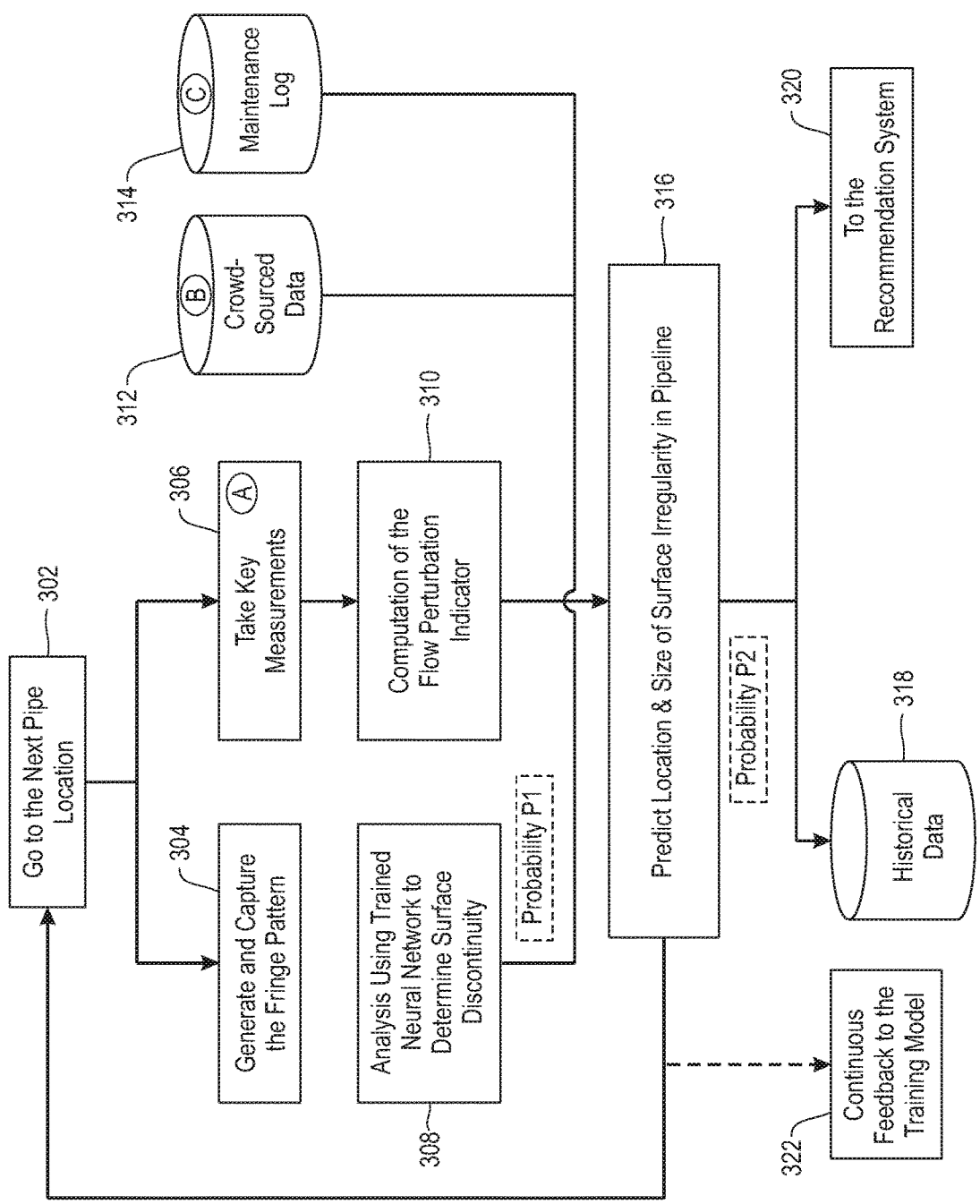
FIG. 3 is a diagram illustrating an overall schematic, according to an exemplary embodiment of the invention.

FIG. 3 is a diagram illustrating an overall schematic, according to an exemplary embodiment of the invention. Step 302 includes proceeding to a (next) pipe location. Subsequently, step 304 includes generating and capturing the fringe pattern at that location, and step 306 includes taking one or more measurements at that location (via sensors on the in-pipeline detection device). Such measurements can include, for example, flow rate, directional flow changes, sphere axis inclination, etc.

Step 308 includes conducting analysis using a trained neural network to determine surface discontinuity within the pipeline at that location (generating a first probability (P1) value), and step 310 includes computing, based on the fringe pattern and the obtained measurements, a flow perturbation indicator. Based on the flow perturbation indicator, as well as the obtained measurements, crowd-sourced data 312 (such as user complaints, reported issues, social media commentary, etc.) and maintenance history and/or logs 314, step 316 includes predicting the size and location of one or more surface irregularities within the pipeline (thereby generating a second probability (P2) value). The prediction can then be provided to a recommendation system 320, stored in an historic data database 318, and/or submitted to a continuous feedback mechanism 322 which will refine a training model to be used with subsequent iterations (and returning to step 302).

At least one embodiment of the invention can additionally include assigning a score to such predictions and/or the discontinuities contained therein to be further used in determining whether or not the in-pipe defect is potentially dangerous (with a related time-line), whether remedial action is urgently required, or if remedial action can be carried out during a future maintenance cycle.

Figure 4:
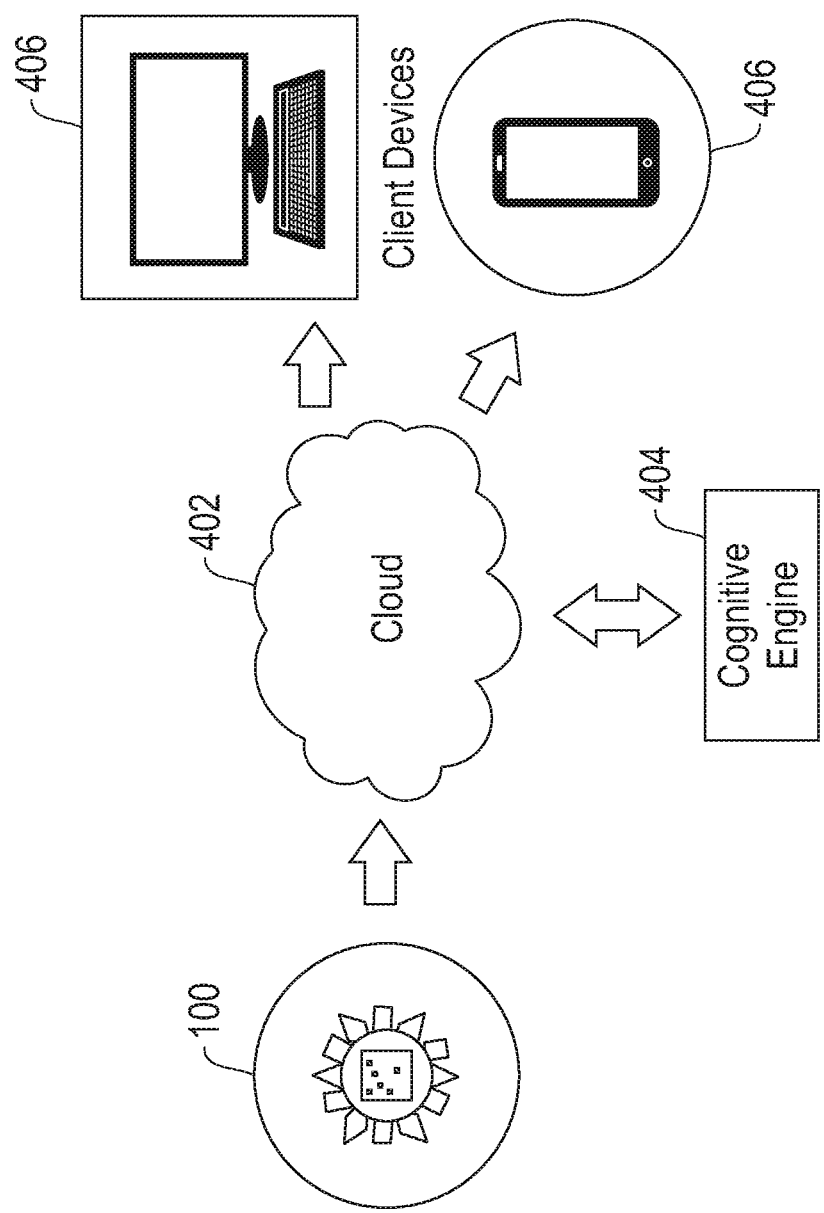
FIG. 4 is a diagram illustrating system architecture, according to an exemplary embodiment of the invention.

FIG. 4 is a diagram illustrating system architecture, according to an exemplary embodiment of the invention. By way of illustration, FIG. 4 depicts an in-pipeline defect detection device 100, which provides data via a cloud network 402 to a cognitive engine 404 (for example, a remote server). The cognitive engine 404, as detailed herein, carries out various analyses and functions (for example, carrying out an inference-based reasoning algorithm such as detailed herein) on the provided data from device 100, and forwards generated data and/or information via cloud network 402 to one or more client devices 406.

In one or more embodiments of the invention, the in-pipeline defect detection device 100 can include a microprocessor and a communication component, which can enable the device 100 to carry out one or more analytical functions and forward such data (as well as any measurements obtained by the detectors and sensors of the device) to the cognitive engine 404 via the cloud network 402. The cognitive engine can additionally obtain and/or handle additional data sources such as crowd-sourced data and historical and/or maintenance-related data, and use such data in conjunction with the data provided by the in-pipeline defect detection device 100 to generate defect predictions and/or recommendations via one or more algorithms.

Additionally, the running of the in-pipeline defect detection device 100 (and the sensors therein) can be carried out on a timed schedule job, via manual instruction, and/or automatically upon a triggering event. Such triggering events can be pre-determined based on various parameters such as manual requests, routine maintenance, urgent need for inspection (as derived by the system or by an operator), etc.

Based on measurements obtained by the in-pipeline defect detection device 100, the cognitive engine can, for example, compare multiple freckle patterns, observe anomalies based on pipe structure and/or material, correlate size and length of a leak to an observed pattern, profile pipe health, etc. In one or more embodiments of the invention, using mobile platforms with laser imaging technologies (via the defect detection device 100), a pipeline profile can be built for specific areas of a pipeline which have issues resulting from limited image analysis or lack of additional information. Determining whether a processed image depicts a section of pipeline with an issue can include comparing a current image with a stored "pristine pipe" image, and/or executing a clustering algorithm to form regions via homogenous clustering and classifying an image as corresponding with a defect or not.

Additionally, at least one embodiment of the invention can include implementing a mobile sensing platform by fitting the in-pipeline defect detection device with components such as an accelerometer and one or more acoustic flow sensors. In such an embodiment, an accelerometer can detect rotational angle change due to turbulence generated in flow because of structural changes in the pipeline (cracks in surface, sudden increase in surface roughness, etc.). The acoustic flow sensors can detect (sudden) changes in flow due to pipe surface discontinuities.

Also, in one or more embodiments of the invention, an inference-based reasoning algorithm (as described herein) can be executed by the cognitive engine/remote server and/or by the in-pipeline defect detection device, wherein such an algorithm evaluates a variety of input information (such as detailed herein). Such an evaluation can include analyzing changes in fringe patterns using a trained neural network (NN) to surmise presence of surface discontinuity with a certain probability (such as P1 in FIG. 3). Such an evaluation can utilize additional information such as a change in axis orientation of a mobile sensing element (in-pipeline defect detection device) due to a variation of turbulent flow because of pipe-surface changes. The evaluation can also utilize additional information such as validation of a change in the flow rate of liquid in the pipe from on-sensor flow measurements (due, for example, to changes in the pipe surface). Based on such evaluations, executing the inference-based reasoning algorithm can result in generating a prediction of the location and size of a surface irregularity in the pipeline with a corresponding probability (such as P2 in FIG. 3, wherein P2>P1).

Figure 5:
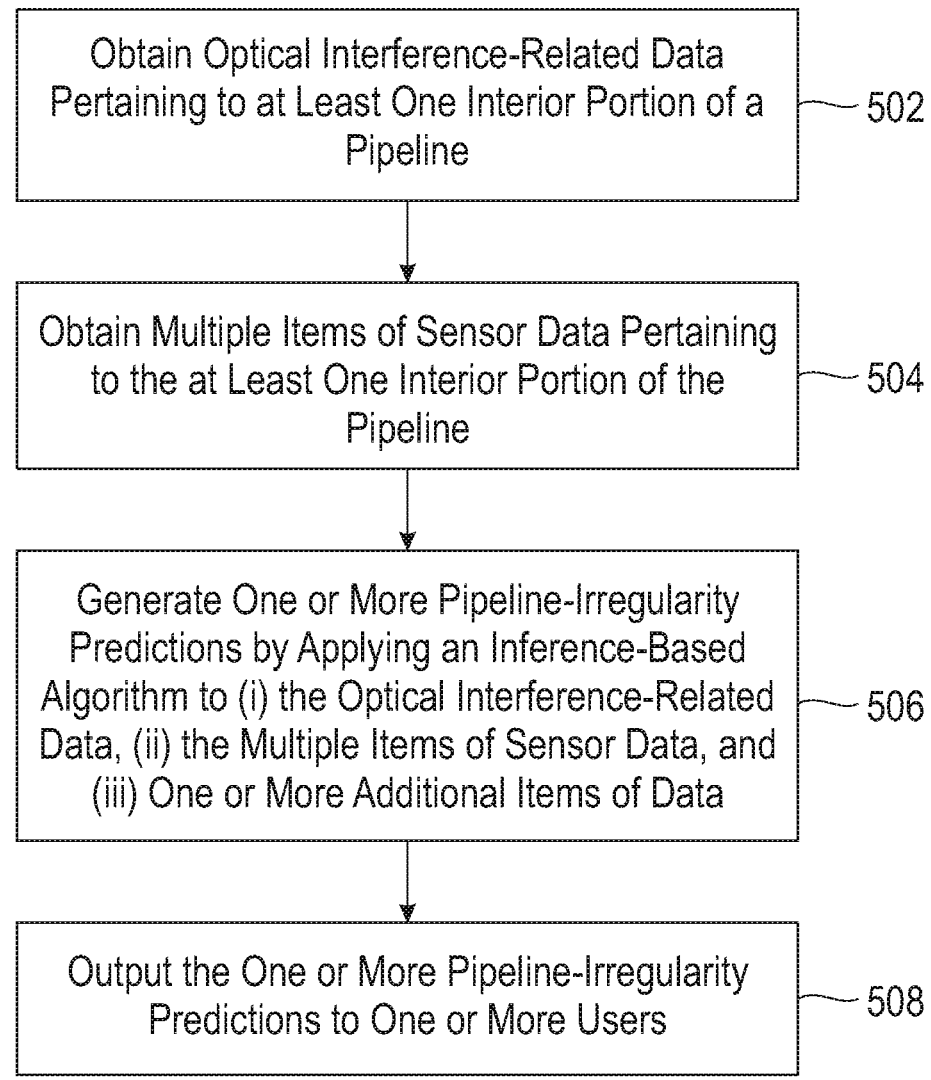
FIG. 5 is a flow diagram illustrating techniques according to an embodiment of the invention.

FIG. 5 is a flow diagram illustrating techniques according to an embodiment of the present invention. Step 502 includes obtaining optical interference-related data pertaining to at least one interior portion of a pipeline. Step 504 includes obtaining multiple items of sensor data pertaining to the at least one interior portion of the pipeline. The multiple items of sensor data can include flow-related data, pressure-related data, location-related data, and/or acceleration-related data.

Step 506 includes generating one or more pipeline-irregularity predictions by applying an inference-based algorithm to (i) the optical interference-related data, (ii) the multiple items of sensor data, and (iii) one or more additional items of data, wherein each of the one or more pipeline-irregularity predictions comprises (a) an identified location within the interior surface of the pipeline of a predicted irregularity and (b) an estimated size of the predicted irregularity. The one or more additional items of data can include one or more items of crowd-sourced information and/or one or more items of maintenance history data related to the pipeline.

Additionally, each of the one or more pipeline-irregularity predictions can include an estimated probability value attributed to the pipeline-irregularity prediction and/or an estimated severity value attributed to the pipeline-irregularity prediction. Further, at least one embodiment of the invention can include determining a response time estimation in connection with one or more maintenance activities, wherein determining the response time estimation is based on the estimated severity value attributed to the pipeline-irregularity prediction.

Step 508 includes outputting the one or more pipeline-irregularity predictions to one or more users. Further, applying the inference-based algorithm can include analyzing, in conjunction with a neural network, (i) the optical interference-related data, (ii) the multiple items of sensor data, and (iii) one or more additional items of data. Also, at least one embodiment of the invention can include outputting the one or more pipeline-irregularity predictions to a feedback mechanism related to training the neural network.

Also, an additional embodiment of the invention includes an in-pipeline defect detection device that includes multiple light-emitting sources, one or more detection sources, and at least one processor coupled to at least one memory, wherein the at least one processor generates one or more pipeline-irregularity predictions by applying an inference-based algorithm to data obtained via (i) the multiple light-emitting sources and (ii) the one or more detection sources, wherein each of the one or more pipeline-irregularity predictions comprises (a) an identified location within the interior surface of the pipeline of a predicted irregularity and (b) an estimated size of the predicted irregularity. The multiple light-emitting sources can include one or more optical laser diodes, one or more LEDs, etc., and the one or more detection sources can include one or more cameras, one or more sensors (such as one or more acoustic flow sensors), one or more accelerometers, etc. Such a device also includes a housing component encasing (i) the multiple light-emitting sources, (ii) the one or more detection sources, and (iii) the at least one processor coupled to at least one memory, wherein the housing component comprises one or more motion control components that facilitates controlling motion of the in-pipeline defect detection device within a pipeline. Additionally, the one or more motion control components can include one or more motion control magnets.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
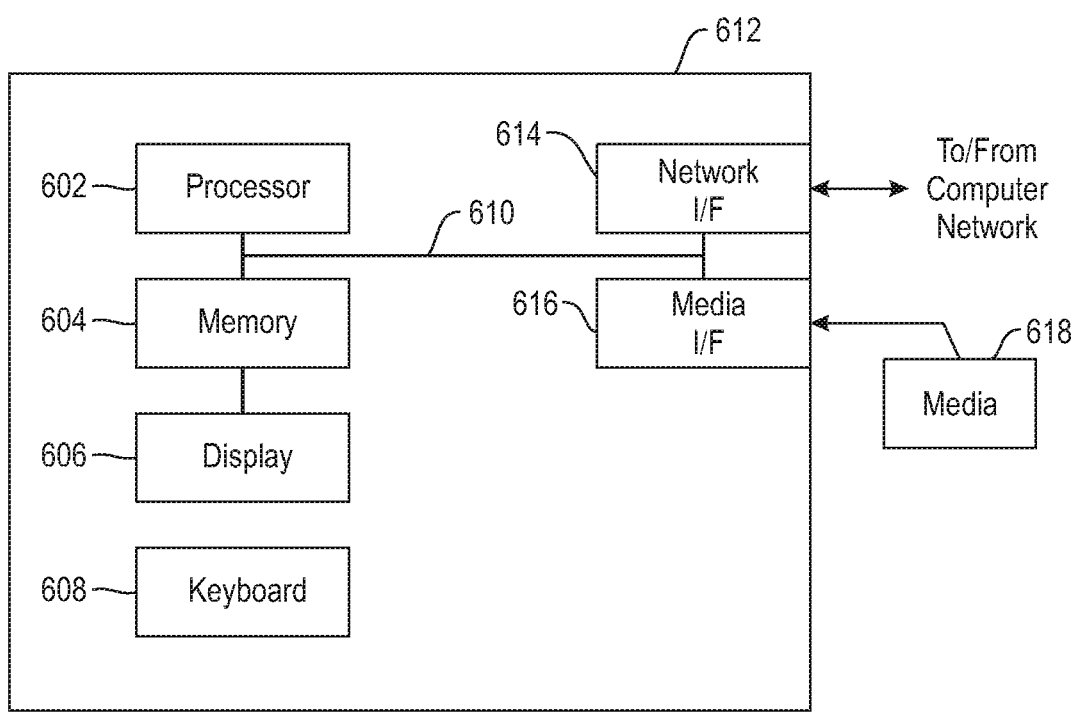
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
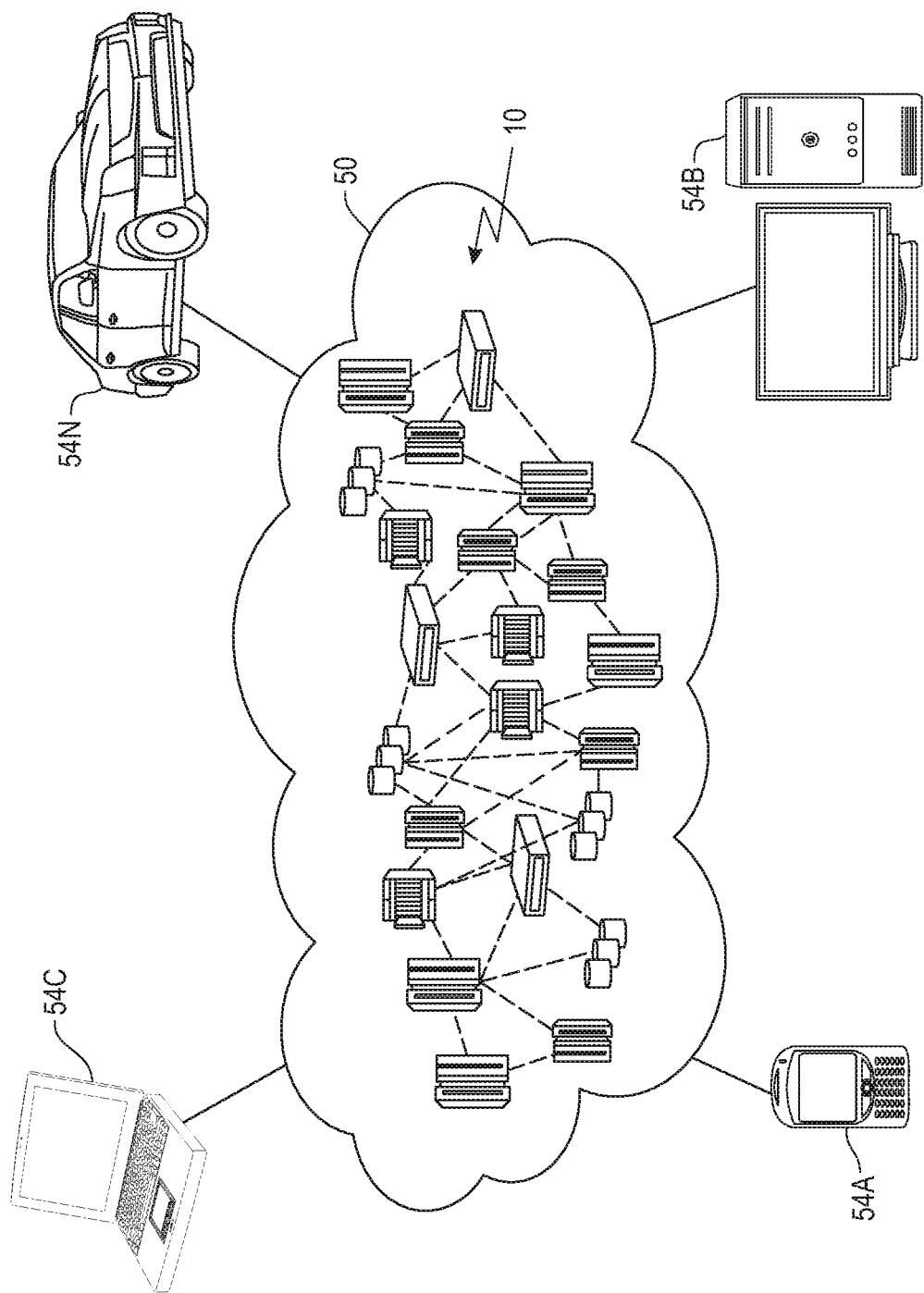
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
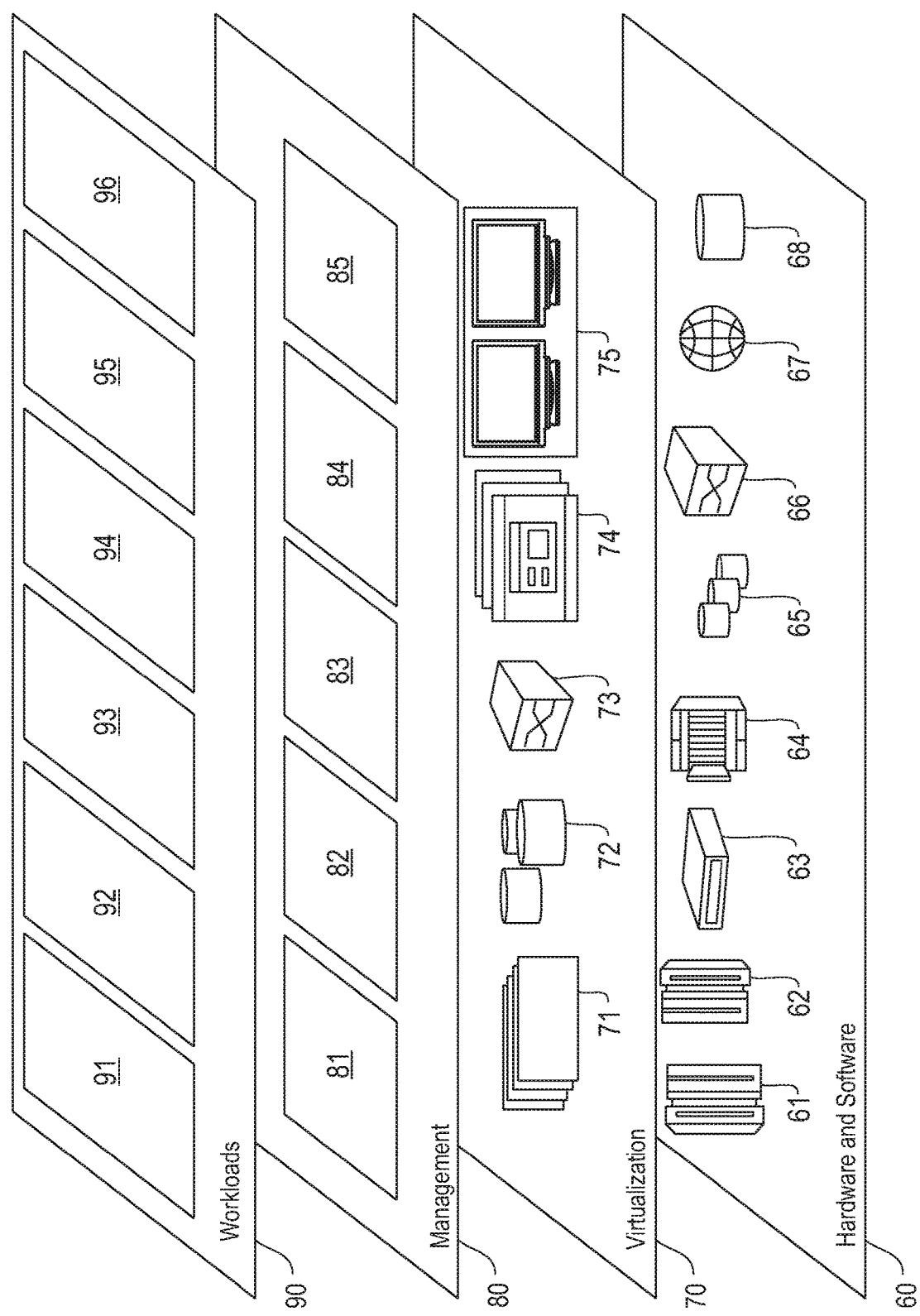
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in-pipeline defect detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating fringe patterns sensitive to surface defects using LEDs of an in-pipe detector device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   obtaining optical interference-related data pertaining to at least one interior portion of a pipeline;
   obtaining multiple items of sensor data pertaining to the at least one interior portion of the pipeline;
   generating one or more pipeline-irregularity predictions by processing, using a neural network, (i) the optical interference-related data, and (ii) the multiple items of sensor data, wherein generating the one or more pipeline-irregularity predictions comprises (a) determining at least one surface discontinuity within the interior surface of the pipeline by analyzing, using the neural network, one or more changes in a fringing pattern associated with the optical interference-related data and the multiple items of sensor data, and (b) determining, using the at least one determined surface discontinuity and additional items of data, an identified location within the interior surface of the pipeline of a predicted irregularity and an estimated size of the predicted irregularity, wherein the additional items of data comprise crowd-sourced information comprising social media commentary and one or more public complaints pertaining to one or more negative issues associated with at least one particular region relevant to the pipeline; and
   outputting the one or more pipeline-irregularity predictions to one or more users;
   wherein the method is carried out by at least one computing device.

2. The computer-implemented method of claim 1, wherein the multiple items of sensor data comprise flow-related data.

3. The computer-implemented method of claim 1, wherein the multiple items of sensor data comprise pressure-related data.

4. The computer-implemented method of claim 1, wherein the multiple items of sensor data comprise location-related data.

5. The computer-implemented method of claim 1, wherein the multiple items of sensor data comprise acceleration-related data.

6. The computer-implemented method of claim 1, wherein the additional items of data comprise one or more items of maintenance history data related to the pipeline.

7. The computer-implemented method of claim 1, wherein each of the one or more pipeline-irregularity predictions comprises an estimated probability value attributed to the pipeline-irregularity prediction.

8. The computer-implemented method of claim 1, wherein each of the one or more pipeline-irregularity predictions comprises an estimated severity value attributed to the pipeline-irregularity prediction.

9. The computer-implemented method of claim 8, comprising:
   determining a response time estimation in connection with one or more maintenance activities, wherein said determining the response time estimation is based on the estimated severity value attributed to the pipeline-irregularity prediction.

10. The computer-implemented method of claim 1, comprising:
outputting the one or more pipeline-irregularity predictions to a feedback mechanism related to training the neural network.

11. A computer program product comprising a computer readable storage medium having program instructions embodied therewith, the program instructions executable by a computing device to cause the computing device to:
obtain optical interference-related data pertaining to at least one interior portion of a pipeline;
obtain multiple items of sensor data pertaining to the at least one interior portion of the pipeline;
generate one or more pipeline-irregularity predictions by processing, using a neural network, (i) the optical interference-related data, and (ii) the multiple items of sensor data, wherein generating the one or more pipeline-irregularity predictions comprises (a) determining at least one surface discontinuity within the interior surface of the pipeline by analyzing, using the neural network, one or more changes in a fringing pattern associated with the optical interference-related data and the multiple items of sensor data, and (b) determining, using the at least one determined surface discontinuity and additional items of data, an identified location within the interior surface of the pipeline of a predicted irregularity and an estimated size of the predicted irregularity, wherein the additional items of data comprise crowd-sourced information comprising social media commentary and one or more public complaints pertaining to one or more negative issues associated with at least one particular region relevant to the pipeline; and
output the one or more pipeline-irregularity predictions to one or more users.

12. A system comprising:
a memory; and
at least one processor operably coupled to the memory and configured for:
obtaining optical interference-related data pertaining to at least one interior portion of a pipeline;
obtaining multiple items of sensor data pertaining to the at least one interior portion of the pipeline;
generating one or more pipeline-irregularity predictions by processing, using a neural network, (i) the optical interference-related data, and (ii) the multiple items of sensor data, wherein generating the one or more pipeline-irregularity predictions comprises (a) determining at least one surface discontinuity within the interior surface of the pipeline by analyzing, using the neural network, one or more changes in a fringing pattern associated with the optical interference-related data and the multiple items of sensor data, and (b) determining, using the at least one determined surface discontinuity and additional items of data, an identified location within the interior surface of the pipeline of a predicted irregularity and an estimated size of the predicted irregularity, wherein the additional items of data comprise crowd-sourced information comprising social media commentary and one or more public complaints pertaining to one or more negative issues associated with at least one particular region relevant to the pipeline; and
outputting the one or more pipeline-irregularity predictions to one or more users.

* * * * *